No. 862,008. PATENTED JULY 30, 1907.
G. NEBEL.
SEPARATING POT.
APPLICATION FILED MAY 2, 1907.
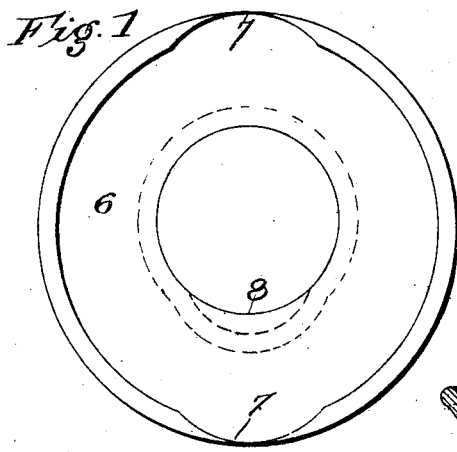
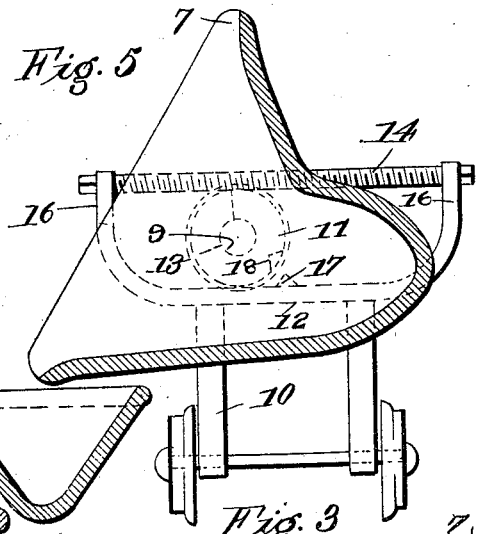
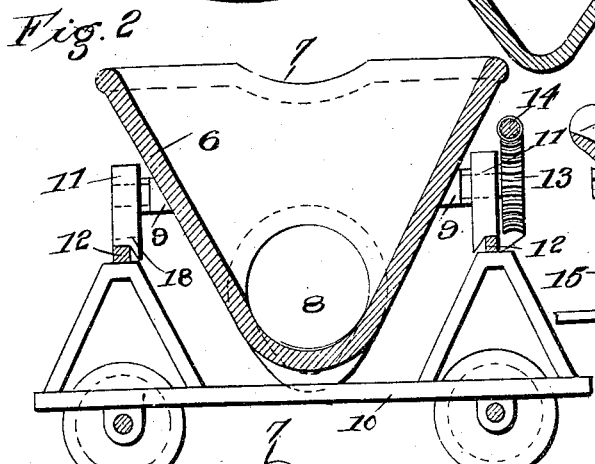
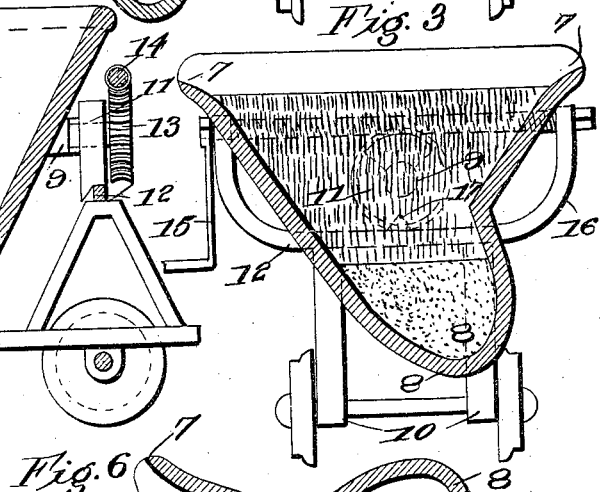
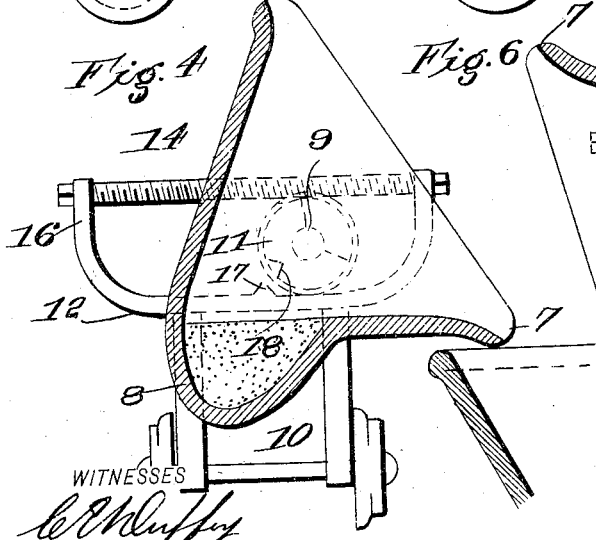
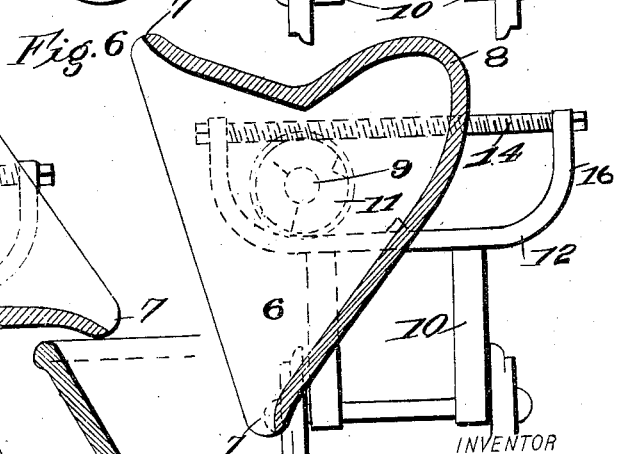
WITNESSES
INVENTOR
GUSTAV NEBEL
BY
ATTORNEYS

UNITED STATES PATENT OFFICE.

GUSTAV NEBEL, OF MONTEREY, MEXICO.

SEPARATING-POT.

No. 862,008.　　　　Specification of Letters Patent.　　　　Patented July 30, 1907.

Application filed May 2, 1907. Serial No. 371,463.

*To all whom it may concern:*

Be it known that I, GUSTAV NEBEL, a citizen of the United States, residing at Monterey, Nuevo Leon, Mexico, have invented a new and useful Improvement in Separating-Pots, of which the following is a specification.

This invention is a separating pot for use in smelting, to separate the matte from the slag, as well as from the crust formed by the cooling of the slag.

In the present state of the art, a funnel shaped pot is used, with a tap hole at a certain height for the slag to run out, and another hole below for the matte to run out, the holes being located according to the quantity of matte. The holes are stopped by fire clay and are tapped at the proper time by means of pointed bar or poker. The use of such pots is attended with inconvenience and loss of time, so that often the slag cools and becomes solid before the separation is effected. In other instances the clay stopper becomes loose and is forced out prematurely, and the whole contents of the pot run out, to waste or disadvantage. My invention remedies these defects by providing a pot without holes, and having a special shape by virtue of which the slag and matte as well as the crust are poured or taken out separately, and so simply and rapidly that only a very thin crust is formed on the sides of the pot.

The invention is illustrated in the accompanying drawings, in which

Figure 1 is a plan of the pot, removed from its carriage or truck. Fig. 2 is a vertical longitudinal section thereof. Fig. 3 is a vertical cross section thereof. Fig. 4 is a cross section, with the pot in the position of pouring off the slag. Fig. 5 is a similar view in position of pouring off the matte. Fig. 6 is a similar view in position of dislodging and emptying the crust.

The body 6 of the pot is substantially funnel shaped as usual, with or without lips 7 at opposite sides. At the bottom or lower part, the pot has a lateral pocket or bowl 8, the size or capacity of which is proportioned according to the maximum quantity of matte to be received and separated at each charge.

The pot is mounted on trunnions 9 on a track 10 whereby it may be transported. The trunnions have wheels or segments 11 resting on cross tracks 12, and one trunnion also has a worm gear 13 meshing with a worm 14 which may be turned by a hand crank 15 applied to either end thereof, the worm being carried by upturned brackets 16 at the ends of the track. The tracks 12 have middle V-projections 17 which engage V-notches 18 in the wheel segments 11 to hold the parts and prevent slipping when the pot is upright and in transit.

When the charge or mass is run into the pot the matte settles into the bowl or pocket at the bottom and the slag floats thereon. To separate and dump the slag, the pot is tilted to one side, as indicated in Fig. 4, which allows the slag to flow out, the matte being held within the pocket 8. Then, the matte is run off by tilting the pot to the other side, as shown in Fig. 5. Finally, whatever crust has formed on the sides of the pot is dislodged, and dumped by tilting the pot to extreme position on the same side, as shown in Fig. 6. It will be seen that this provides a simple means for separating the products and for conveniently delivering the same separately. The extent of the tilt for the slag discharge may be governed by the amount of matte, the object being to tilt it enough to discharge practically all the slag and retain whatever matte there is, in the pocket, much more quickly and advantageously than with the pots having the ordinary tap holes.

I claim

1. A tiltable separating pot having in the bottom thereof a lateral enlargement forming a pocket, substantially as and for the purpose described.

2. A separating pot tiltable to opposite sides and having in one side, at the bottom thereof, an enlargement or pocket for retaining part of the contents, when tilted to that side.

3. A tiltable separating pot having a funnel shaped body and a pocket at the bottom formed in one side thereof.

4. The combination of a truck, a pot pivotally mounted thereon, and means to tilt the pot to either side, the pot having means to retain part of its contents when tilted to one side.

GUSTAV NEBEL.

Witnesses:
　JUAN F. BURCHARD,
　ADOLFO VILLARREAL.